C. D. PETTIS.
BRAKE SHOE.
APPLICATION FILED FEB. 13, 1913.
1,065,721.
Patented June 24, 1913.
3 SHEETS—SHEET 2.
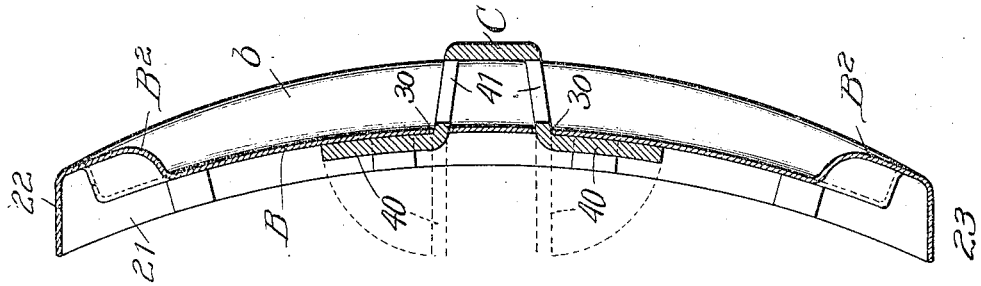
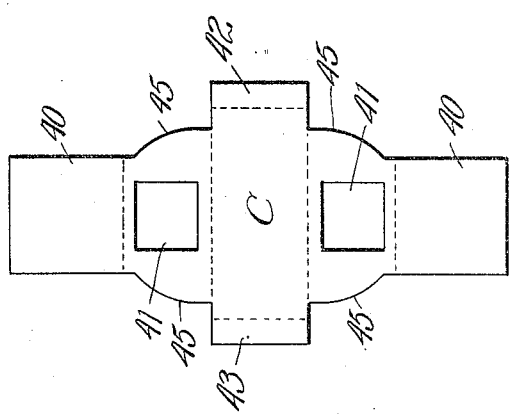
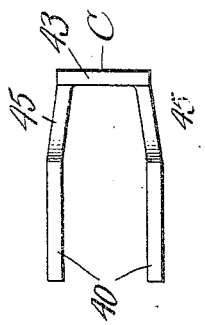
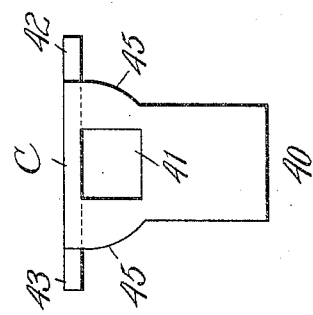
Witnesses:
Inventor.
Clifton D. Pettis
By Pierce, Fisher & Clapp
Attys.

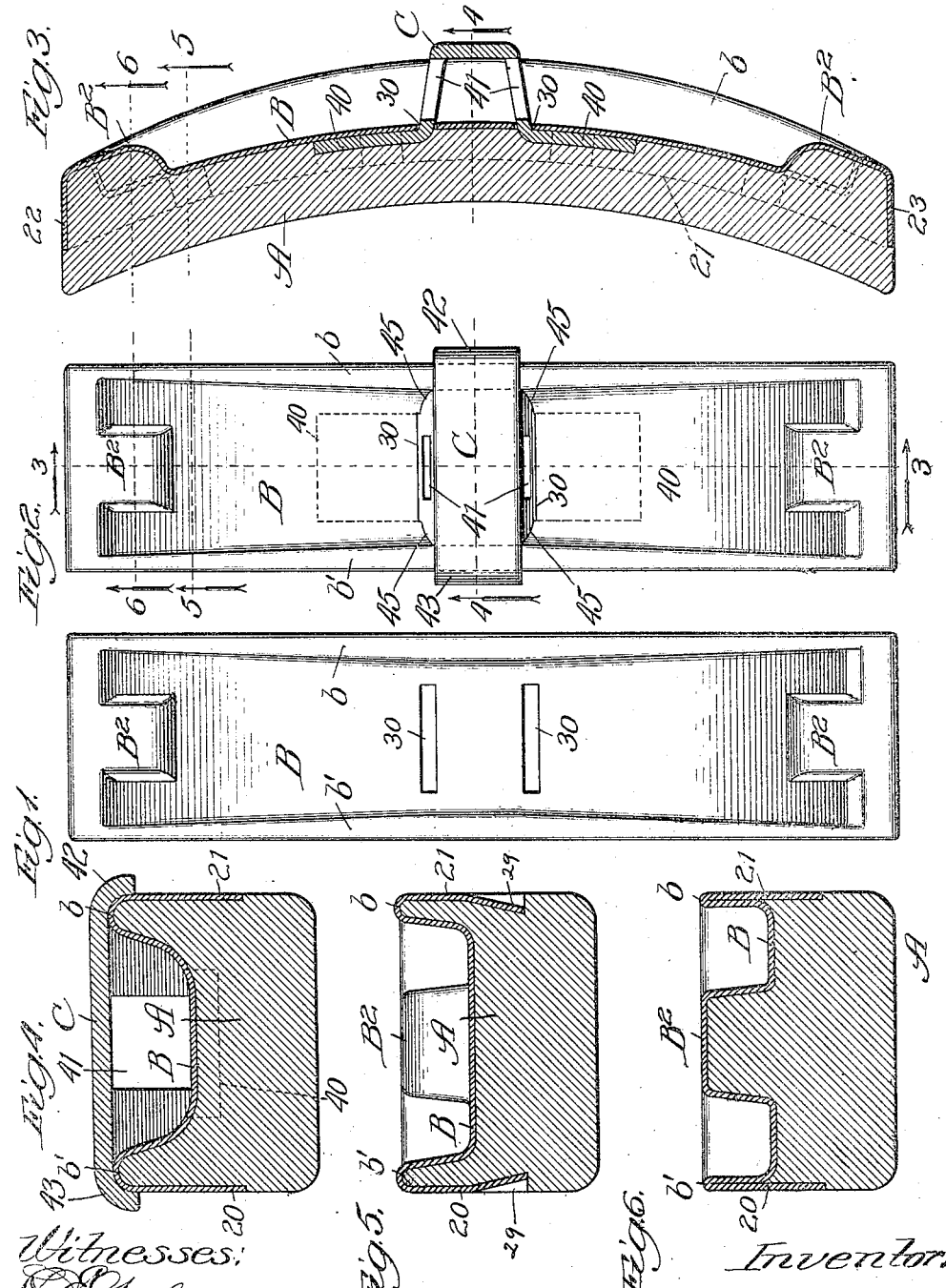

C. D. PETTIS.
BRAKE SHOE.
APPLICATION FILED FEB. 13, 1913.
1,065,721.
Patented June 24, 1913.
3 SHEETS—SHEET 3.
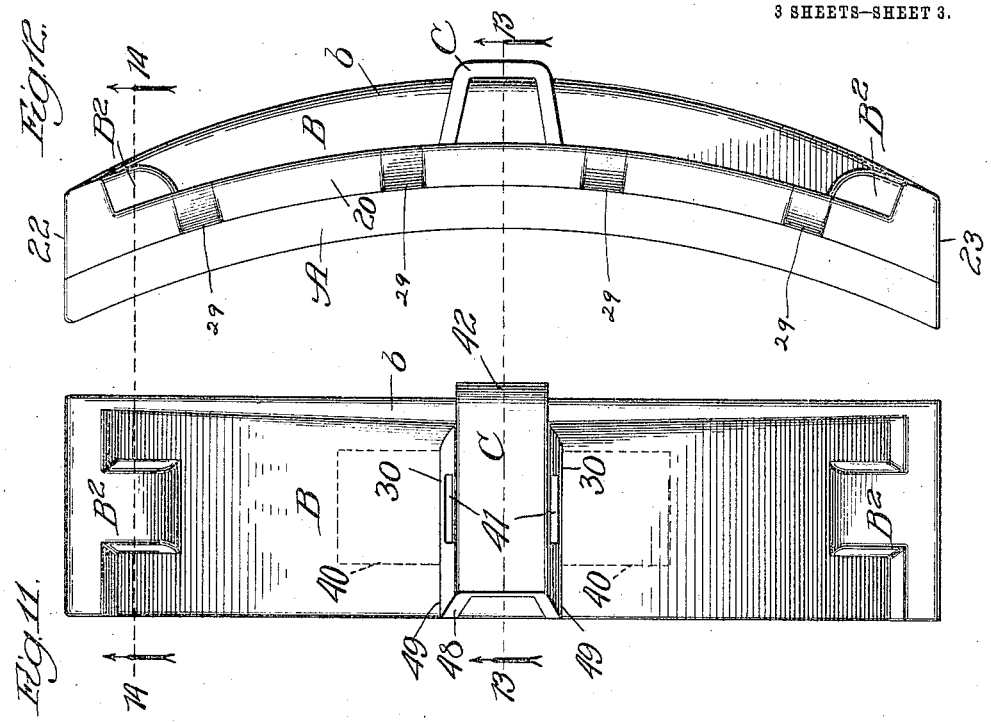
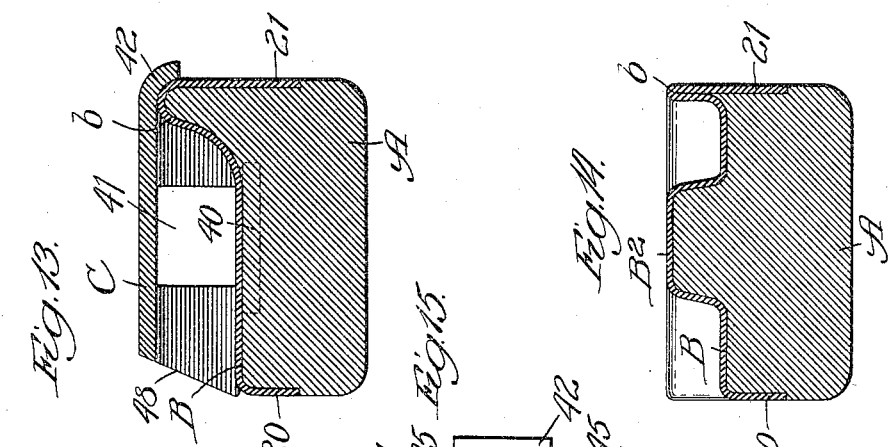

UNITED STATES PATENT OFFICE.

CLIFTON D. PETTIS, OF CHICAGO, ILLINOIS.

BRAKE-SHOE.

1,065,721.
Specification of Letters Patent.
Patented June 24, 1913.

Application filed February 13, 1913. Serial No. 748,259.

*To all whom it may concern:*

Be it known that I, CLIFTON D. PETTIS, a citizen of the United States, and a resident of the city of Chicago, county of Cook, and State of Illinois, have invented certain new and useful Improvements in Brake-Shoes, of which I do declare the following to be a full, clear, and exact description, reference being had to the accompanying drawings, forming part of this specification.

My present invention has relation more particularly to that class of brake shoes for railway cars in which provision is made for reinforcing or strengthening the shoe so as to prevent the fracture and falling away of the shoe after it has become reduced by wear.

My invention consists in the features of novelty hereinafter described, illustrated in the accompanying drawings, and particularly pointed out in the claims at the end of this specification.

In the drawings, my invention is shown as applied to a brake shoe, the reinforcing back whereof comprises a raised rib extending along one or both of the side edges of the back, as set forth in an application filed by me in the United States Patent Office of even date herewith, Serial No. 748,258, and I do not wish to be understood as claiming in this application the features of construction set forth and claimed in said co-pending application.

My present invention relates more particularly to the construction of the center lug of the brake shoe and the manner of attaching the same to the reinforcing back of the shoe.

Figure 1 is a plan view of a brake shoe with the center lug removed. Fig. 2 is a plan view with the center lug in place. Fig. 3 is a view in longitudinal section on line 3—3 of Fig. 2. Fig. 4 is a view in cross section on line 4—4 of Fig. 2. Fig. 5 is a view in cross section on line 5—5 of Fig. 2. Fig. 6 is a view in cross section on line 6—6 of Fig. 2. Fig. 7 is a view in central longitudinal section through the ductile metal back. Fig. 8 is a detail view of the blank from which the center lug will be formed. Figs. 9 and 10 are views in elevation of the center lug. Fig. 11 is a plan view, and Fig. 12 is a view in side elevation showing a modified form of the invention. Fig. 13 is a view in cross section on line 13—13 of Figs. 11 and 12. Fig. 14 is a view in cross section on line 14—14 of Figs. 11 and 12. Fig. 15 is a view of the blank from which will be formed the modified center lug illustrated in Figs. 12 to 14.

The body A of the brake shoe is preferably of cast metal that is united in the casting operation to the back B that is formed of ductile metal. The back B has formed at its sides the raised hollow ribs $b$ and $b'$, the outer walls of these ribs 20 and 21 extending down the sides of the body A of the brake shoe to a distance below the plane of the back of the shoe. The end walls 22 and 23 of the back of the shoe extend toward the wearing face of the body A of the shoe to approximately the same distance as the side walls 20 and 21. As shown, the back B of the shoe is provided with raised end lugs $B^2$ formed integral therewith. When the cast metal forming the body A of the shoe is poured into the back B, in the casting operation, such metal will flow into the hollow ribs $b$ and $b'$ and end lugs $B^2$ of the back, thereby greatly increasing the strength of the shoe.

The back B of the shoe is shown as provided adjacent its center with slots 30 adapted to receive the inwardly projecting members 40 of the center lug C. Preferably, this center lug is formed of a blank of the shape shown in Fig. 8. That is to say, the blank has projecting portions or members 40 adapted to pass through the slots 30 in the back of the brake shoe, has slots 41 and portions 42 and 43 projecting laterally and adapted to be bent upon the dotted lines shown in Fig. 8 of the drawings. When the blank shown in Fig. 8 is bent upon the dotted lines shown in Fig. 8 of the drawings, the lug will be in the shape shown in Figs. 9 and 10, and will then be in readiness to have its projecting parts or members 40 pass through the slots 30 in the back of the shoe, after which such parts will be bent outwardly in opposite directions, as shown in Fig. 7 of the drawings. The parts of the center lug at each side of the slots 41 therein (which slots are adapted to receive the usual wedge or key for connection to the brake head), are curved or shaped, as at 45, so as to snugly fit against the curved inner walls of the ribs $b$ and $b'$ of the back B of the shoe; and these inner walls of the ribs $b$ and $b'$ will compose the ends of the center lug.

The crown of the center lug, C' is preferably provided, at its ends, with hooks or flanges 42 and 43 which fit over and interlock with the ribs $b'$, $b'$. Such interlocking hooks are, however, not essential where the center lug is arranged between two longitudinal side ribs, as in the form shown in Figs. 1 to 7, inclusive.

In forming a brake shoe embodying my present invention, the center lug will be cut and bent to shape, as above described, and will then be attached to the back of the shoe, as shown in the drawings; after which the cast metal, that is to form the body of the shoe, will be poured into the back and will unite therewith in this casting operation. The cast metal flowing around and uniting with the projecting portions or members 40 of the center lug will securely guard against any danger of the withdrawal of these members from the back of the shoe.

In the embodiment of the invention illustrated in Figs. 12 to 15 of the drawings, the body A of the shoe and the back B will be formed in the manner hereinbefore described, except that the longitudinal rib $b'$ of the back B will be omitted. When one of the ribs of the back B is thus omitted, the center lug C will be modified, as illustrated in Figs. 13 and 15 of the drawings. This modified form of center lug will preferably be formed from a blank cut to the shape shown in Fig. 15. This modified form of center lug will have projecting portions or members 40 adapted to pass through the slots 30 in the back of the shoe and will have a laterally projecting portion 42 on one side and a laterally projecting portion 48 on the other side, and will be formed with the slots 41, as in the lug hereinbefore described. When the blank shown in Fig. 15 is bent upon the dotted lines there shown, the modified lug will be of the shape illustrated in Figs. 11 and 13. This lug will then have its extended portions 40 passed through the slots 30 of the back B and bent in opposite directions against the inner face of the back, as shown in Fig. 11. The curved portions 45, at one side of the lug, will fit against and conform to the inner wall of the rib $b$ and the hook shaped flange 42 will fit over and interlock with the top of such rib, so as to aid in effectively holding the center lug in proper position. The walls 49 at the opposite end of the lug will bear upon the upper face of the back and the edges of these walls are preferably inclined, as shown in the drawings. When the cast metal body A of the shoe is united to the back casting operation, the lug will be securely locked in place against possibility of disengagement from the back. Preferably, the side walls 20 and 21 of the back B will be formed with inwardly struck portions 29 that will effectively interlock with the body A of the shoe in the casting operation, and thus aid in more securely uniting these parts together.

By making the center lug C separable from the back B, this lug may be made of considerably thicker metal than the back, and this is an important feature, since a comparatively thin metal only is necessary for the back, whereas a thicker and stronger body of metal is desirable for the center lug.

It is obvious that the precise details of construction above set out may be varied without departing from the scope of the invention, and that features of the invention may be employed without its adoption as an entirety.

Having thus described my invention, what I claim as new, and desire to secure by Letters Patent, is:—

1. A brake shoe having one at least of its side edges provided with a raised rib extending lengthwise of its back and a ductile metal fastening lug having projecting portions united to the body of the shoe in the casting operation, said lug having walls bearing against said raised rib and having a flange interlocked with said rib.

2. A brake shoe comprising a perforated back having one at least of its side edges provided with a raised rib and a center lug having depending members passing through the perforations in the back, the side walls of said lug abutting against said rib.

3. A brake shoe comprising a perforated back having one at least of its side edges formed with a raised rib extending lengthwise of the shoe, and a ductile metal center lug having parts projecting through said back, said lug abutting against said raised rib and interlocked therewith.

4. A brake shoe comprising a perforated back of ductile metal having raised ribs extending along each side thereof and a ductile metal center lug interlocked with said back, the ends of said center lug abutting against said ribs.

5. A brake shoe having one at least of its side edges provided with a raised rib and a ductile metal center lug united to the body of the brake shoe, said lug having a flange extending over the top of said rib and interlocked therewith.

CLIFTON D. PETTIS.

Witnesses:
ELEANOR HAGENOW,
KATHARINE GERLACH.